United States Patent Office 3,257,194
Patented June 21, 1966

3,257,194
TRIALKYLTIN PROPIOLATES
Lee A. Miller, Kirkwood, Mo., assignor to Monsanto Company, a corporation of Delaware
No Drawing. Filed Dec. 28, 1961, Ser. No. 162,926
12 Claims. (Cl. 71—2.7)

This invention relates to organometallic compounds. More particularly this invention provides new and useful acetylenic organotin compounds and uses of such compounds as an essential active ingredient in biological toxicant compositions, for example, in insecticidal, fungicidal and herbicidal compositions.

It is an object of this invention to provide new and useful trialkyltin propiolates. Another object of this invention is to provide a method for making trialkyltin propiolates. Still another object of this invention is to provide new biological toxicant compositions which are particularly effective in killing insects and preventing the growth of undesired plant life and spores of fungus organisms. Other objects, advantages, and aspects of this invention will become apparent as the description of the invention proceeds.

According to this invention trialkyltin propiolates are prepared by reacting propiolic acid with a bis(trialkyltin) oxide, substantially according to the scheme

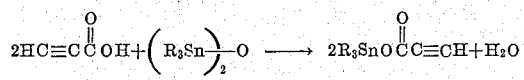

wherein each R denotes an alkyl radical having from 1 to 18 carbon atoms.

Thus, the present invention provides compounds of the formula

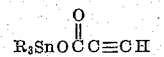

wherein R is as defined above, simple examples of which are triethyltin propiolate and trioctyltin propiolate.

Further, according to the present invention there are provided biological toxicant compositions, e.g., insecticidal, herbicidal, and fungicidal compositions containing a carrier adjuvant and as an essential active ingredient, a lethal amount of at least one trialkyltin propiolate compound having the above generic formula.

Further, according to another aspect of this invention there are provided methods for controlling biological pests, e.g., insects, undesirable plant life, and fungi, etc. by the application of said above defined biological toxicant compositions.

The process of this invention which utilizes propiolic acid and a bis(trialkyltin) oxide to obtain a trialkyltin propiolate involves a condensation reaction wherein the bis(trialkyltin) oxide reacts, forming two molecular equivalents of trialkyltin propiolate with two molecular equivalents of propiolic acid which splits off hydrogen to form water, as a by-product. These compounds may be characterized as having a triple bond, and a trialkylstannic atom bonded through an oxygen atom to the carboxyl group of the propiolic acid.

Compounds within the scope of this invention and the bis(trialkyltin) oxides from which they may be obtained by reaction with propiolic acid are exemplified by the following: trimethyltin propiolate from bis(trimethyltin) oxide, triethyltin propiolate from bis(triethyltin) oxide, tri-n-propyltin propiolate from bis(tri-n-propyltin) oxide, triisopropyltin propiolate from bis(triisopropyltin) oxide, tri-n-butyltin propiolate from bis(tri-n-butyltin) oxide, triisobutyltin propiolate from bis(triisobutyltin) oxide, tripentyltin propiolate from bis(tripentyltin) oxide, triheptyltin propiolate from bis(triheptyltin) oxide tridecyl propiolate from bis(tridecyltin) oxide, tridecyltin propiolate from bis(tridecyltin) oxide, tripentadecyltin propiolate from bis(tripentadecyltin) oxide, and trioctadecyltin propiolate from bis(trioctadecyltin) oxide. Compounds within the scope of the invention may also be prepared by reacting propiolic acid with a bis(trialkyltin) oxide having mixed alkyl groups, i.e., having different alkyl groups bonded to the tin atom of the molecule. For example, dimethylethyltin propiolate is obtained by reacting propiolate acid with bis(dimethylethyltin) oxide, and dibutyloctyltin propiolate is obtained from propiolic acid and bis(dibutyloctyltin) oxide.

The bis(trialkyltin) oxides, used in preparing the trialkyltin propiolates, may be obtained by a variety of methods. They may be formed by a direct or indirect dehydration of trialkyltin hydroxides. They may also be prepared by the oxidation of trialkyltin hydrides with metal oxides. For example, bis(trimethyltin) oxide has been prepared by treating trimethyltin hydroxide with elemental sodium in benzene. Bis(triethyltin) oxide has been prepared by hydrolyzing triethyltin halides with aqueous alkali and dehydrating the resulting product at elevated temperatures; it has also been produced by distilling triethyltin hydroxide under reduced pressure, by reacting silver oxide with S-methyl triethyltin or bis(triethyltin) sulfide, and by reacting triethyltin hydride with metal oxides such as HgO, ZnO, Fe$_2$O$_3$, PbO, As$_4$O$_6$, V$_2$O$_5$, and KMnO$_4$. Bis(trihexyltin) oxide has been prepared by shaking trihexyltin bromide with aqueous sodium hydroxide in ether. Bis(trioctyltin) oxide has been prepared in a similar manner by brominating tetraoctyltin at —40° C., shaking the resulting trioctyltin bromide with aqueous 33% sodium hydroxide in ether, and drying the product after removal of the solvent at 100° C./12 mm. The higher bis(trialkyltin) oxides may be prepared by similar methods.

The propiolic acid used in the reaction with the bis(trialkyltin) oxides to produce trialkyltin propiolates is a well known, readily available material.

The trialkyltin propiolates are prepared by directly reacting propiolic acid with the bis(trialkyltin) oxide in the presence or absence of a solvent or diluent. If used, such solvent or diluent may be any non-reactive solvent or diluent such as the common aromatic solvents, e.g., benzene, toluene, etc., and the aliphatic solvents, e.g., hexane, cyclohexane, heptane, etc., as well as the aliphatic halides such as methylene chloride, methylene bromide, chloroform, carbon tetrachloride. The reaction generally may be conducted over a broad temperature range short of decomposition of the reactants and products, e.g. from about 20° C. to 150° C., although more preferred temperatures range from about 50° C. to 150° C. Atmospheric pressure is generally sufficient but reduced or elevated pressures may be used. Reaction times vary depending upon the bis(trialkyltin) oxide being used and the extent of reaction desired. Generally, for efficient use of reactants with reasonably good yields of product, the reactants are allowed to stand, or are shaken or stirred for time periods ranging from ½ to 10 hours, the shorter time periods generally being used with the more vigorous physical reaction conditions.

Separation of the trialkyltin propiolate products from the reaction media may be accomplished by known chemical and physical means. When the product is liquid, distillation or solvent extraction procedures are normally sufficient. Solid products may be separated by filtration, washings, recrystallization procedures, etc. Further purification by selective solvent extraction, distillation, or by absorptive agents such as activated carbon or clays can precede the removal of the inert liquid or solvent. However, the trialkyltin propiolates may often be used for biological toxicant purposes without further purification.

The presently provided trialkyltin propiolates are well-defined compounds ranging from clear or oily liquids, to waxy or crystalline solids which are generally soluble in organic solvents such as ether and acetone but which are insoluble in water. As will be shown hereinafter, the presently provided trialkyltin propiolates are characterized by high biological toxicant activity, particularly as insecticides, herbicides, and fungicides. This effect is demonstrated when they are present in biological toxicant compositions in very small concentrations, for example, in quantities of as low as from 0.1 to 200 parts per million. These compounds are also active stabilizers against the effects of heat and light in halogen-bearing polymeric compositions in general, e.g., in polyvinyl fluoride, polyvinyl chloride, polyvinylidene chloride, etc., and are especially suitable for such purposes where it is necessary to retain clarity of the polymer composition, such as in polymeric polyvinyl chloride films, sheets, etc. and where a low toxicity polymeric composition is desired. These compounds are also active catalysts for isocyanate condensation reactions, e.g., in the polyurethane foam making art.

The presently provided trialkyltin propiolates are effective against a wide variety of insect pests, fungus organisms, and undesired plant life. It will be understood that the term "insect" and "insecticide" unless otherwise modified are used herein in their broad common usage to include spiders, mites, ticks, and like pests which are not in the strict biological sense classed as insects. Thus, the usage herein conforms to the definitions provided by Congress in Public Law 104, the "Federal Insecticide, Fungicide, and Rodenticide Act" of 1947, Section 2, subsection $h$, wherein the term "insect" is used to refer not only to those small invertebrate animals belonging mostly to the class Insecta, comprising six-legged usually winged forms, as beetles, bugs, bees, flies, and so forth, but also to other allied classes or arthropods whose members are wingless and usually have more than six legs, as spiders, mites, ticks, centipedes, and wood lice.

Although the trialkyltin propiolate are useful per se for controlling a wide variety of insect, fungus, and plant life, a particular embodiment of this invention provides biological toxicant compositions containing as an essential active ingredient therein an insecticidal, fungicidal, or herbicidal amount of one or more trialkyltin propiolate compound in a dispersed form in a suitable extending agent. The term "dispersed" as used herein means that the particles of the trialkyltin propiolate may be molecular in size and held in true solution is a suitable organic solvent. It means further that the particles may be colloidal in size and distributed throughout a liquid phase in the form of suspensions or emulsions or in the form of particles held in suspension by wetting agents. It also includes particles which are distributed in a semisolid viscous carrier such as petrolatum or soap or other ointment base in which they may be actually dissolved in the semi-solid or held in suspension in the semi-solid with the aid of suitable wetting or emulsifying agents. The term "dispersed" also means that the particles may be mixed with or distributed throughout a solid carrier providing a mixture in particular form, e.g., pellets, granules, powders, or dusts. The term "dispersed" also includes mixtures which are suitable for use as aerosols including solutions, suspensions, or emulsions of the trialkyltin propiolate in a carrier such as dichlorodifluoromethane and like fluorochloroalkanes which boil below room temperature at atmospheric pressure.

As insecticides the trialkyltin propiolate may be applied conveniently in the form of a spray containing the trialkyltin propiolate in a concentration within the range of 0.01% to 10% by weight. Although they are insoluble in water, they are soluble in organic solvents. They may be dispersed directly in water or as a solution in an organic solvent emulsified in an aqueous medium by the aid of a dispersing agent. If application in dust form is preferred, they may be diluted with a carrier such as clay, talc or bentonite. For use as a preemergent or contact herbicide the trialkyltin propiolate compositions may be sprayed in an organic solvent emulsified in an aqueous medium by the aid of a dispersing agent, or may be admixed with the soil prior to the germination of the seeds therein.

The choice of the means of dispersing the toxicants is within the province of one skilled in the art. If the compounds are volatile the treating agents are preferably dissolved or dispersed in a suitable liquid medium which when formulated with a suitable emulsifying agent or other surface active agent will enable a uniform dispersion in water. The use of solutions or dispersions also insures a uniform application of the trialkyltin propiolate to the substrate being treated.

However the biological toxicants are formulated, the treatment of the soil for preemergent herbicides purpose must necessarily involve the incorporation of an amount sufficient to destroy the germinating activities of the undesired plants. Some variation will be observed with different soil types and some differences in rate of application will be dictated by the sensitivity of some plants to the compounds. Suitable solid diluents are those which render compositions dry and permanently free-flowing. Thus, microscopic materials should be avoided. Effective solid diluents are the finely divided carriers, including the clays such as the kaolinites, the bentonites, and the attapulgites; other minerals in natural state, such as talc, pyrophyllite, quartz, diatomaceous earth, fuller's earth, chalk, rock phosphate, and sulfur; and chemically modified minerals such as acid washed bentonites, precipitated calcium phosphates, precipitated calcium carbonate and colloidal silica. These diluents may represent a substantial portion, for example, 50% to 98% by weight of the entire formulation.

Liquid compositions for insecticidal, fungicidal, and preemergent herbicide uses may be solutions or liquids dispersions. The choice of the liquid medium will depend to a great extent upon the physical properties of the active ingredient. It is frequently desirable to add a small amount of an organic solvent which can be readily dispersed in the aqueous medium to produce a heterogeneous dispersion of the active ingredient in water.

From an economical point of view the manufacturer must supply the agriculturist with a low cost concentrate or spray base or particulate solid base in such form that by merely mixing with water or solid extender (e.g. powdered clay or talc) or other low cost material available to the agriculturist at the point of use, he will have an easily prepared insecticidal or fungicidal spray or particulate solid composition. In such a concentrate composition, the trialkyltin propiolate generally will be present in a concentration of 5 to 95% by weight, the residue being any one or more of the well known biological toxicant adjuvants, such as the various surface active agents (e.g. detergents, a soap, or other emulsifying or wetting agents, surface active clays), solvents, diluents, carrier media adhesives, spreading agents, humectants, and the like.

There are a large number of organic liquids which can be used for the preparation of solutions, suspensions or emulsions of these compounds; for example, there can be used isopropyl ether, acetone, methyl ethyl ketone, dioxane, cyclohexanone, carbon tetrachloride, ethylene dichloride, tetrachloroethane, hexane, heptane, and similar higher liquid alkanes, hydrogenated naphthalenes, solvent naphtha, benzene, toluene, xylene, petroleum fractions (e.g., those boiling almost entirely under 400° F. at atmospheric pressure and having a flash point above about 80° C., particularly kerosene), mineral oils having an unsulfonatable residue above about 80 percent and preferably above about 90 percent. In those instances wherein there may be concern about the phytotoxicity of the organic liquid extending agent, a portion of the same can be replaced by such low molecular weight aliphatic hydrocarbons as dipentene, diisobutylene, propylene trimer, and the like. In certain instances it is advantageous to employ a mixture of organic liquids as the extending agent.

When supplied to the situs of the biological pest in the form of emulsions or suspension, the biological toxicant composition containing one or more trialkyltin propiolate as the active ingredient may be prepared by dispersing the active component either per se or in the form of an organic solution thereof in water with the aid of a water-soluble surfactant. The term "surfactant" as employed here and in the appended claims is used as in Volume II of Schwartz, Perry and Berch's "Surface Active Agents and Detergents" (1958 Interscience Publishers, Inc., New York) in place of the expression "emulsifying agent" to connote generically the various "emulsifying agents," "dispersing agents," "wetting agents," and "spreading agents" that are adapted to be admixed with the active compounds of this invention in order to secure better wettting and spreading of the active ingredients in the water vehicle or carrier in which they are insoluble by lowering the surface tension of the water (see also Frear, "Chemistry of Insecticides, Fungicides, and Herbicides," second edition, page 280). These surfactants include the well-known capillary-active substances which may be anion-active (or anionic), cation-active (or cationic), or non-ionizing (or non-ionic) which are described in detail in Volumes I and II of Schwartz, Perry and Berch's "Surface Active Agents and Detergents," cited supra, and also in the November 1947 issue of Chemical Industries (pages 811–824) in an article entitled "Synthetic Detergents" by John W. McCutcheon and also in the July, August, September, and October 1952 issues of Soap and Sanitary Chemicals under the title "Synthetic Detergents." The disclosures of these articles with respect to surfactants are incorporated in this specification by reference in order to avoid unnecessary enlargement of this specification. The preferred surfactants are the water soluble anionic surface active agents set forth in US 2,846,398 (issued August 5, 1958). In general it is preferred that a mixture of water soluble anionic and water soluble non-ionic surfactants be employed.

In all of the forms described above the dispersions can be provided ready for use in combatting biological pests in general and insects and nematodes in particular. However, they can also be provided in a concentrated form suitable for mixing with or dispersing in other extending agents. As illustrative of a particularly useful concentrate is an intimate mixture of a trialkyltin propiolate of this invention with a water soluble surfactant which lowers the surface tension of water in the weight proportions of 0.1 to 15 parts of the surfactant with sufficient of the trialkyltin propiolate to make 100 parts by weight. Such a concentrate is particularly adapted to be made into a spray for combatting various forms of insect pests by the addition of water thereto. As an example of such a concentrate is an intimate mixture of 95 parts by weight of tributyltin propiolate and 5 parts by weight of a water soluble nonionic surfactant such as polyoxyethylene ether. Another example of a useful insecticidal concentrate composition is from 2 to 4 lbs. of the trialkyltin propiolate dissolved in a sufficient organic solvent such as kerosene, xylene, naphtha, etc., containing from 1 to 10% of a surface active agent blend to make a gallon of insecticide concentrate composition. The surface active agent blend may comprise, e.g. a mixture of a non-ionic surface active agent such as a polyoxyethylene ether and an anionic surfactive agent such as alkyl-aryl sulfonate.

The following examples illustrate methods of preparing trialkyl propiolate compounds and the activities of such compounds as insecticidal, fungicidal, and herbicidal agents. These examples are illustrative only and are not meant to limit the scope of the invention.

EXAMPLE 1

A mixture of 29.8 g. of bis(tri-n-butyltin) oxide (0.05 mole) and 7.0 g. of propiolic acid (0.1 mole) was stirred in a reaction vessel at 120°–130° C. for one-half hour, cooled, and then heated for another one-half hour at 100° C. to insure complete reaction as evidenced by cessation of water by-product evolution. There was obtained as product 30 g. of non-distillable yellow oil which analyzed as containing 49.67% carbon and 8.52% hydrogen as compared with 50.17% carbon, and 7.86% hydrogen. Infrared analysis of the product was as follows:

| Cm.⁻¹ | Function indicated |
|---|---|
| 3300 | ≡CH |
| 2145 | }—C≡C— |
| 2100 | } |
| 1575 | } O ‖ |
| 1540 | } —C—O— |
| 1365 | R₃CSn— |
| 695 | C—Sn |

The above data is consistant with the proposed structure

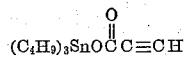

for tributyltin propiolate.

EXAMPLE 2

This example illustrates the insecticidal activity of the trialkyltin propiolates.

A culture tube which had been rinsed with acetone to eliminate any possible insecticide contamination, was filled with 50 ml. of distilled water. A sample of tributyltin propiolate was dissolved in acetone to give a concentration of 2 parts per million (p.p.m.), and then 0.05 ml. of the solution was pipetted into the culture tube containing the distilled water. The tube was stoppered and shaken to insure complete mixing. Approximately 20 early fourth instar yellow fever mosquito larvae, *Aedes aegypti*, were transferred to the culture tube. The larvae were held at room temperature for 24 hours at which time it was observed that 100 percent of the larvae were killed.

Repeating the above test at an effective concentration of 0.2 p.p.m. gave an 80% kill of the mosquito larvae.

EXAMPLE 3

This example illustrates the effectiveness of the trialkyltin propiolates as a *soil fungicide*.

Tributyltin propiolate was drenched at 30 p.p.m. (on a soil weight basis) over the surface previously sterile soil which had been mixed with corn meal sand culture of *Pythium ultimum* and *Rhizoctonia solani*, each in its own portion of soil. The treated-soil cups were incubated for 50–60 hours at 65°–70° F. in a 100 percent relative humidity chamber. The fungicidal activity of the tributyltin propiolate was based upon the degree of inhibition of mycelial growth on the surface of the soil. No mycelial growth was observed indicating a complete inhibition of the fungus growth.

EXAMPLE 4

This example illustrates the effectiveness of trialkyltin propiolates as pre-emergent herbicides.

Aluminum pans are leveled filled with a good grade of sterilized top soil. The soil surface was then compacted to a depth of ⅜″ to ½″ from the top of the pan. On top of the soil were placed 5 seeds of each of radish, morning glory, and tomato; 10 seeds of each of sugar beet, sorghum, and brome grass; 20 seeds each of wild buckwheat, giant foxtail, rye grass and wild oat; approximately 20 to 30 (a volume measure) of each of pigweed and crab grass; and either 2 or 3 seeds of soybean. Two different type plantings were made; one wherein the herbicidal composition was applied to the surface of the soil and the other wherein the composition was admixed with or incorporated in the top layer of soil. In the surface-application planting the seeds were arranged with 3 soybean seeds across the center of the large aluminum pan, the monocotyledon or grass seed scattered randomly over ⅓ of the soil surface, and the dicotyledon or broad leaf seeds scattered randomly over the remaining ⅓ of the soil surface at the other end of the pan. The seeds were then covered with ⅜" of prepared soil mixture and the pan leveled. In the soil incorporation planting, a measured amount of soil is sprayed with ½ the aliquot of the chemical solution, the soil throughly mixed, and the balance of the chemical solution sprayed over the surface. After another thorough mixing, the treated soil is used to cover the seeds. The planted pan, except for controls are sprayed with an aliquot of an organic solvent containing the chemical to be tested. After spraying, the pans are placed on sands in a bench in the greenhouse and the bench flooded with water from ¼ to ½ inch above the sand level. The test pans of soil are allowed to adsorb moisture through the perforated bottom until the surface is about ½ moist. The excess water is then drained off below the level of the sand surface. The surface of the test pans rapidly become moist by capillary action and are maintained adequately wet by sub-irrigation for the two week test. The pans are observed for herbicidal activity after two weeks.

Pre-emergent herbicidal ratings are given as follows:

| | Percent control |
|---|---|
| 0—no injury | 0–25 |
| 1—slight injury | 26–50 |
| 2—moderate injury | 51–75 |
| 3—severe injury | 76–100 |

The pre-emergent herbicidal activity of the trialkyltin propiolates of this invention are recorded in Table I for various application rates of the tributyltin propiolate in both surface and soil corporation applications in Table I, the various seeds are represented by letters as follows:

| | |
|---|---|
| A | General grass. |
| B | General broadleaf. |
| C | Morning glory. |
| D | Wild oats. |
| E | Brome grass. |
| F | Rye grass. |
| G | Radish. |
| H | Sugar beets. |
| I | Foxtail. |
| J | Crab grass. |
| K | Pigweed. |
| L | Soybean. |
| M | Wild buckwheat. |
| N | Tomato. |
| O | Sorghum. |

| Rate, lb./acre | Plant Type | | | | | | | | | | | | | | |
|---|---|---|---|---|---|---|---|---|---|---|---|---|---|---|---|
| | A | B | C | D | E | F | G | H | I | J | K | L | M | N | O |
| 25 | 3 | 3 | 2 | 3 | 3 | 3 | 3 | 3 | 3 | 3 | 3 | 2 | 3 | 3 | 3 |
| 5 | 3 | 3 | 2 | 2 | 2 | 2 | 3 | 3 | 3 | 3 | 3 | 0 | 2 | 3 | 2 |

EXAMPLE 5

The effectiveness of the trialkyltin propiolates as heat and light stabilizers for halogen-containing polymer compositions is illustrated by this example.

Test compositions were formulated to contain the following indicated ingredients:

| Ingredient | Composition, Parts/Part of PVC resin | | |
|---|---|---|---|
| | A | B | C |
| Polyvinyl chloride (PVC) homopolymer resin | 100 | 100 | 100 |
| Plasticizer [di-(2-ethylhexyl)phthalate] | 50 | 50 | 47 |
| Epoxidized Soybean Oil | | | 3 |
| Heat and Light Stabilizer | 1 | 3 | 2 |
| Processing Aid (to prevent sticking) Stearic Acid | ½ | ½ | ½ |

Compositions of the above types were formulated and compounded as follows:

The PVC homopolymer, plasticizer, and stabilizer(s) were weighed into a tared 250 ml. beaker in the above indicated proportional amounts so that the combined weights of the ingredients of the composition totaled a maximum of 60 g. The contents of the beaker was stirred until a homogeneous mixture was obtained, and then removed from the beaker and placed into the rolls of a 3" by 6" roll mill machine manufactured by William R. Thropp and Sons Company, Trenton, New Jersey. The formulations were mixed for 5 minutes in the rolls at 165° C. and then sheets of the milled composition were pressed out. Small rectangular portions of the sheeted compositions were cut out and attached to the result sheet for comparison with other portions which are removed from the sheet after designated numbers of hours of heat and light treatment.

For the heat stability test samples of milled formulations of the polymer composition containing the test compound as a heat stabilizer, and another milled formulation containing no heat stabilizer (control) were attached to a looped strip of cardboard or thin aluminum sheeting. The thus mounted samples were attached to brackets which were attached to rotary racks and put into an air circulating oven heated to 170° C. The oven air ducts were open at all times. The duration of the test is until failure. However, the mounted sample of each formulation was removed from the oven at the end of each 20 minutes and an indicative portion is cut from the sample and stapled (or otherwise attached) to a Heat Stability Card. In each test the test was discontinued if the formulation samples turned dark brown or black before 200 minutes have passed.

In reporting the results of degradation of the formulated composition, the time periods required to change the clear film color of the starting formulation through the following color ranges were noted.

Clear film
Coloration degrees:
  Slight
  Light yellow
  Yellow
  Light amber
  Dark amber
  Brown
  Black Sample of the heat treated sheets were cut at specified time intervals as the color changed. The samples so taken were mounted on the Heat Stability Card as above for color comparative purposes.

For the light stability test milled sheets of the polyvinyl chloride formulations, described above, were tested according to the uniform Method D–822–46T ASTM Standards on Plastics, March 1953, p. 810 in An Atlas Single Arc Weathering Apparatus (Fade-Ometer), as follows:

The samples of the test formulations of plasticized polyvinyl chloride were fastened to the test panels supplied with the weathering unit, and are suspended from the units exposure racks in direct rays of the ultraviolet arc light. The arc light is provided by a combination of carbon arcs known commercially as No. 70 solid carbons and No. 20 cored carbons, the combination being such that one full-length carbon, either cored or solid is used with a pair of opposite type carbons, cut to a size length of 4 inches. The temperature within the Fade-Ometer was controlled by the circulation of sufficient air to produce a black panel temperature of 145°±5° F. The test pansls in the Fade-Ometer made four complete revolutions about the arc light per minute and were exposed to the arc light for a period of at least 1000 hours actual exposure or until that time when pronounced discoloration or degradation of the test sample warrants the termination of the test.

Below is a tabulation of the results obtained:

| Stabilizer | Formulation No. | Heat Stability, Minutes to failure at 170° C. | Light Stability, Hours to failure in Fade-Ometer |
|---|---|---|---|
| Control (no stabilizer) | | 20 | 50 |
| Commercial | A | 80 | 600 |
| | B | 120 | 1,400 |
| | C | 140 | 1,400 |
| Tributyltin propiolate | A | 80 | 800 |
| | B | 100 | 2,700 |
| | C | 140 | 2,300 |

The results indicate that tributyltin propiolate is similar to the commercial stabilizer as heat stabilizer; however the tributyltin propiolate exhibits substantially more light stabilization than the commercial stabilizer.

Reasonable variation and modification of the invention as described are possible, the essence of which is that there have been provided (1) new and useful trialkyltin propiolate compounds, (2) a method for making these trialkyltin propiolates, (3) biological toxicant compositions comprising as an essential active ingredient a trialkyltin propiolate, and (4) methods for controlling biological pests by applying to the situs of the pests a toxic quantity of the compounds of this invention.

What is claimed is:
1. A compound of the formula

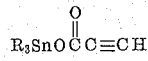

wherein each R denotes an alkyl radical having from 1 to 18 carbon atoms.
2. Tri-n-butyltin propiolate.
3. An insecticidal, fungicidal, and herbicidal composition comprising a surface active agent, and a toxic amount of a compound of the formula

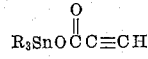

wherein each R denotes an alkyl radical having from 1 to 18 carbon atoms.

4. An insecticidal, fungicidal and herbicidal concentrate composition comprising a trialkyltin propiolate having from 1 to 18 carbon atoms in each alkyl radical and as an insecticidal, fungicidal, and herbicidal adjuvant, a surface active agent, said concentrate containing from 5 to 95% by weight of the trialkyltin propiolate compound.

5. A composition according to claim 4 wherein the trialkyltin propiolate is tri-n-butyltin propiolate.

6. A method of controlling pestiferous organisms comprising contacting said organisms with a biological toxicant composition essentially containing an effective amount of a trialkyltin propiolate having from 1 to 18 carbon atoms in each alkyl radical.

7. A method of combating insects which comprises contacting said insects with an insecticidal adjuvant, and as an essential active ingredient thereof a trialkyltin propiolate having from 1 to 18 carbon atoms in each alkyl radical.

8. A method according to claim 7 wherein the trialkyltin propiolate is tri-n-butyltin propiolate.

9. A method for preventing the undesirable growth of plants and fungi which comprises distributing on the surface of the soil containing seeds of said plants and spores of said fungi a growth-inhibiting amount of a trialkyltin propiolate having from 1 to 18 carbon atoms in each alkyl radical.

10. A method according to claim 9 wherein the trialkyltin propiolate is tri-n-butyltin propiolate.

11. A method for preventing the undesirable growth of plants and fungi which comprises intimately admixing soil containing seeds of said plants and spores of said fungi with a growth-inhibiting amount of a trialkyltin propiolate having from 1 to 18 carbon atoms in each alkyl radical.

12. A method according to claim 11 wherein the trialkyltin propiolate is tri-n-butyltin propiolate.

References Cited by the Examiner

UNITED STATES PATENTS

| 2,864,737 | 12/1958 | Fields et al. | 167—22 |
| 2,873,288 | 2/1959 | Rosenberg et al. | 260—429.7 |
| 2,878,155 | 3/1959 | Cruickshank | 167—22 |
| 2,892,856 | 6/1959 | Ramsden et al. | 260—429.7 |
| 2,957,785 | 10/1960 | Leatherland | 260—429.7 |
| 3,004,843 | 10/1961 | Josephs | 71—2.3 |
| 3,006,749 | 10/1961 | Farmer et al. | 71—2.3 |

TOBIAS E. LEVOW, *Primary Examiner.*

ABRAHAM H. WINKELSTEIN, *Examiner.*

W. J. VAN BALEN, E. C. BARTLETT, F. R. OWENS,
*Assistant Examiners.*